United States Patent [19]
Lambright et al.

[11] 3,805,412
[45] Apr. 23, 1974

[54] AUTOMATED AUDIO INTERROGATING AND REPORTING SYSTEM

[75] Inventors: John E. Lambright, Trafford; Lawrence S. Schmitz; John B. Waclo, both of Pittsburgh, all of Pa.

[73] Assignee: Westinghouse Electric Corporation, Pittsburgh, Pa.

[22] Filed: June 16, 1972

[21] Appl. No.: 263,563

[52] U.S. Cl. .............................. 35/9 A, 346/33 ME
[51] Int. Cl. ............................................. G09b 7/04
[58] Field of Search ................... 35/8 A, 9 A, 35 C; 346/33 ME

[56] References Cited
UNITED STATES PATENTS

| | | | |
|---|---|---|---|
| 3,708,891 | 1/1973 | Rosov | 35/9 A |
| 3,689,930 | 9/1972 | Strickland | 35/8 A X |
| 3,735,503 | 5/1973 | Dow et al. | 35/9 A |
| 3,747,069 | 7/1973 | Hershberg | 35/9 A X |
| 3,747,228 | 7/1973 | Yamamoto | 35/8 A |
| 3,141,243 | 7/1964 | Chapman | 35/9 A |
| 3,194,895 | 7/1965 | Treadwell | 35/8 A X |
| 3,255,536 | 6/1966 | Livingston | 35/9 A |
| 3,360,873 | 1/1968 | Tillotson et al. | 35/9 A |
| 3,405,461 | 10/1968 | Joslow | 35/35 C |
| 3,407,513 | 10/1968 | Conn | 35/9 A |
| 3,484,950 | 12/1969 | Serrell et al. | 35/9 A |
| 3,501,851 | 3/1970 | Price, Jr. et al. | 35/9 A |
| 3,566,370 | 2/1971 | Worthington, Jr. et al. | 340/172.5 |

*Primary Examiner*—Wm. H. Grieb
*Attorney, Agent, or Firm*—D. F. Straitiff

[57] ABSTRACT

Described is an automated self-administered audio interrogating and reporting system, for asking questions and printing out responses to the questions, such as in teleconsultation, taking and recording a patient's medical history, or in order-taking, poll-taking, etc. Questions played from a multi-track magnetic audio quesiton tape are responded to at stop intervals by selective actuation of pushbuttons representing multiple-choice answers, such as "YES," "NO," "DON'T KNOW," etc., and a pushbutton titled "REPEAT," for effecting repeating of the preceding question. Branching by track-switching is effected in response to certain answer selections, according to the questions asked by the tape. The answers are represented by audio-frequency tone signals that can command a real-time printout of narrative answer information stored in audio-frequency code form in a dictionary tape, or that may be played back at a subsequent time to effect such printout command. By recording questions on parallel tracks of the question tape between automatically-effected tape stopping points common to all tracks, allowing the answer responses to restart the tape and control any branching-required variation in sequence of questions presented, and by utilizing such answer responses also to restart the dictionary tape between automatic stop points and to control any branching-required variation in sequence of narrative answers, printout of the answers can simply progress on a step-by-step basis between stop points without requiring searching. The answer tape, in addition to storing audio tone codes representing the above-exemplified answers, also stores audio tone codes representing numerical answers by the interogee, as in response to query concerning his social security number, age, zip code, etc., for example, at the start of the history taking procedure.

6 Claims, 9 Drawing Figures

| TRACK NO. | KEYING TONE | CODE TONES | | | |
|---|---|---|---|---|---|
| 4 | 35Hz | 2KHz | 3KHz | 2KHz | 3KHz |
| 3 | 45Hz | 2KHz | 3KHz | 2KHz | 3K |
| 2 | 35Hz | 2KHz | 3KHz | 2KHz | |
| 1 | 45Hz | 2KHz | 3KHz | 2KHz | |

FIG.7

```
              AUTOMATED MEDICAL HISTORY SYSTEM
                   PATIENT HISTORY REPORT

DATE:  05 03 72         PATIENT IDENTIFICATION NUMBER:  207 32 5589
PATIENT NAME:
___________________________      _______________________________

SEX:   MALE    RACE:  CAUCASIAN   AGE:  29  REGION:  15239

CHIEF COMPLAINT

SOCIAL PROFILE

CITIZEN OF U.S.
BORN IN U.S.
BEEN OUT OF U.S. IN LAST 10 YEARS
SMOKED CIGARETTES
     SMOKED LONGER THAN 5 YEARS
     SMOKED MORE THAN ONE PACK PER DAY
     SMOKES CIGARETTS AT PRESENT TIME
SMOKES PIPE OR CIGARS
DRINKS ALCOHOLIC BEVERAGES
```

FIG.8

AUTOMATED AUDIO INTERROGATING AND REPORTING SYSTEM

BACKGROUND OF THE INVENTION

The invention relates to audio automated interrogating and answer reporting systems, such as for medical history taking.

DESCRIPTION OF THE PRIOR ART

The following U.S. Pat. Nos. were received as a result of a preliminary search: Worthington, Jr. et al, 3,566,370; Conn 3,407,513; Chapman 3,141,243; Treadwell 3,194,895; Tillotson III et al, 3,360,873; Livingston 3,255,536; Price, Jr. et al, 3,501,851; Joslow 3,405,461; and Serrell et al, 3,484,950.

Among the foregoing prior art patents, only the Worthington, Jr. et al patent and the Conn patent disclose systems suitable for interrogating and printing out answers in narrative form, and the former is of a highly complex nature involving the use of a computer and therefore is of a type quite remote from the system of the present invention. Others of these patents are concerned with teaching machines for the most part, where no narrative printout of answers is provided, but which do teach the use of certain branching techniques, of magnetic recording of information, and of tape control codes at audio frequencies and in digital format, etc., which separate features may find use in the present invention.

The system of the Conn patent, while relatively simple as compared to the system of Worthington, Jr. et al, nevertheless has distinguishing characteristics and features that differ significantly from the system of the present invention. The Conn system employs a paper strip on which the questions are printed and exposed to view sequentially for reading one-at-a-time, by unreeling the strip past a viewing window that may be covered or closed for branching, to result in skipping of impertinent question material. Answers are recorded as punches in a paper tape that, after completion of the history taking, is subsequently used to dictate printout of answer words such as "mumps", "measles", etc. from a "SELECTA" data tape that is searched according to the coded answers punched in the answer tape. No realtime printout of answers is discussed in the Conn patent, nor is it apparent that any such real-time printout is realizible by use of the Conn system.

SUMMARY OF THE INVENTION

The present invention, in providing an interrogating and reporting system that presents the questions in audio form, that stores the answers in audio form, and that stores the printout narration for such answers in audio form, affords an extremely versatile arrangement whereby the several basic components of the system may be disposed in immediate adjacency at the same site, but which can communicate with each other by telephone line, thus enabling location of one or more of these components at different sites, if desired, and also enabling communication of one or more of such components with a remote computer for analysis of answer responses.

By providing a system in which any variation in the sequence of questions presented by the question tape for branching purposes is reflected in answers that are used to effect corresponding variation in the printout sequence of narrative answer information from the dictionary tape, simplicity of such system is afforded.

By providing a system that can print out the answer narration either during the time that the questions are being presented, real-time printout, or at a later time by playback of the answer tape, a high degree of flexibility in use of the system is afforded. For example, the narrative answer printout portion of the system in the one case might be shared by several question-asker portions on a batch processing basis resulting in a series of sequential printouts from such question-asker portions.

The foregoing and other advantages and features of the invention will become apparent from the following detailed description of an illustrative embodiment of the invention when taken in connection with the accompanying drawings.

DETAILED DESCRIPTION OF PREFERRED EMBODIMENTS OF THE INVENTION

Figure 1:
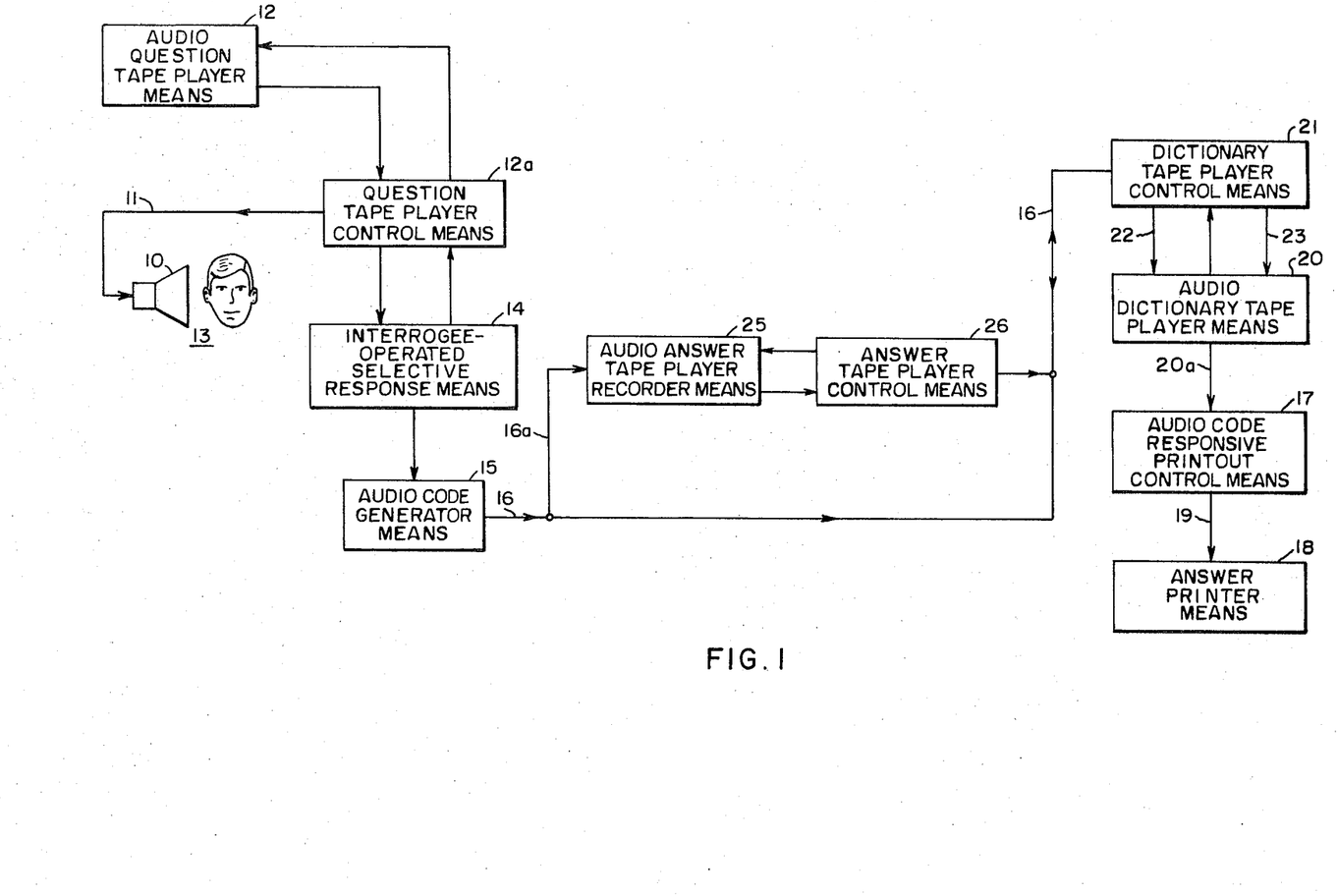
FIG. 1 is a block diagram representing the interrogating and answer reporting system of the present invention in accord with generalized features thereof.

Referring to FIG. 1, the interrogating and answer reporting system of the present invention is what may be referred to as an all-audio system, in which questions are presented audibly via a speaker 10 and an audio line 11 from an audio question tape player means 12 to a person, interrogee 13, such as a patient undergoing interrogation for medical history taking purposes, who responds to such questions by actuation of a manually operable selective response means 14 that, together with audio code generator means 15, develops audio-signal answer information that can be fed via an audio line 16 to a dictionary tape player control means 21 for effecting a real-time answer printout by an answer printer means 18 commanded via line 19 by serial digital code from an audio-code-responsive printout control means 17 according to audio signals received from dictionary tape player means 20 via lines 22 and 23 from control means 21. The audio signal answer information from means 15 can also be fed via a branch 16a of audio line 16 to an audio answer tape recorder means 25 for recording, rewind, and subsequent playback to the control means 21 via an answer tape player control means 26 to obtain a non-real-time answer printout at a time subsequent to completion of the interrogation by the tape player means 12.

Any of the audio lines 11, 16 and 20a can be telephone lines, in accord with the present invention, which permit unlimited separation between the interconnected components and hence their location at different sites, if found to be convenient or desirable.

For example, the audio question tape player means 12 may be located at a site that is remote from that at which the interrogee 13 is located, a patient at home, for example. The patient therefore will listen to the questions played by the tape player means 12 via telephone line 11 and the speaker 10, which may be the earpiece of a telephone (not shown), will communicate his multiple-choice answers such as "YES", "NO", or "DON'T KNOW" via the phone line 11 to a person (not shown) at the site of the question tape player means 12 who will operate the selective response means 14 manually according to such answers to obtain control of the question tape player means 12 and the effecting of the audio coding of such answers by the code generating means 15 for controlling printout of the answers in narrative form. Whereas nearly anyone might qualify as such assistant person (not shown) at the site of the question tape player means 12, it can be arranged to obviate need for and/or constant attention by any such assistant person, by employing a touchtone telephone (not shown) to translate the patient's answers into respective tone codes read by an automatic means (not shown) at the question tape site which transposes them into the same control instructions effected by the selective response means 14 when operated manually.

By way of another example, the audio question tape player means 12, question tape player control means 12a, interrogee-operated selective response means 14, audio code generating means 15, and speaker 10 can be located at one site and the remainder of the equipment may be located at another site which communicates with the audio code generator means 15 via line 16 in the form of a telephone line. In this case, no assistant would be required for answer input or for other than routine test setup, and a number of such question stations at respective different sites, such as doctors' offices or hospital rooms, could be served by one such answer printout station, provided that output from the several question sites reach the printout site at different times, a matter of scheduling.

Still another arrangement is possible, where the printout portion of the system is located remotely from the remainder of the system. In this case, answer tapes recorded at different times and/or places can be played via line 16 in the form of a telephone line to such printout portion, which includes the dictionary tape player control means 21, the audio dictionary tape player means 20, the audio-code-responsive printout control means 17, and the answer printer means 18. Such printout portion can respond to effect a real-time printout of answers, or to receive only answer tape playback, but in either case, only one series of answers can be printed out at one time.

It will be apparent also that all components of the system may be located at the same site, and may be disposed side-by-side at such site. In this case, a printout of answers is available from the printer means 18 at such site, either as a result of real-time printout during the playing and answering of the questions by the interogee, or as a result of playback of such answers at a later time, from an answer tape (not shown) affiliated with the answer tape recorder-player means 25.

Figure 2:
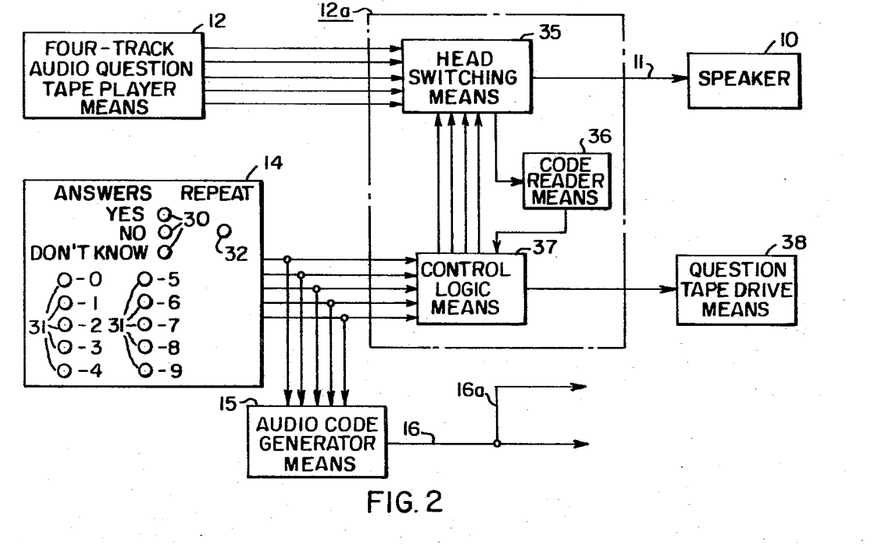
FIG. 2 is a block diagram representing certain details of a question-asking-and-answering portion of the system of the present invention.

Referring to FIG. 2 relating to the question-taking portion of the system, the audio question tape player means 12 uses magnetic recording tape of any convenient type. The question tape player means 12, by way of example, may be constructed to include four tape heads to read four tracks across the width of the tape. The interrogeeoperated selective response means 14 includes a plurality of pushbuttons 30 bearing appropriate legends indicating answers which may be selected by the interrogee, as well as one pushbutton 32 operable to effect a repeating of the question last played by the question tape player means 12. Pushbuttons 31 represent numerical answers which can be selected by the interrogee during a preliminary period of interrogation in which identification of such interrogee or patient may be introduced into the record for final printout as such as the "PATIENT IDENTIFICATION NUMBER" 207 32 5589 at the top of the exemplified printout shown in FIG. 8. Other variable numbers pertaining to a particular interrogee, such as age and zip code region appearing on the sample printout of FIG. 8 also will be introduced into the system by appropriate actuation of the pushbuttons 31 of FIG. 2.

Following such interrogee-identifying portion of interrogation, which may be effected by use of the question tape player means 12 and the response means 14, further questions of a multiple-choice form which can be answered by "YES", "NO", or "DON'T KNOW", for example, are played by the player means 12. After the playing of each question, the player means 12 stops automatically and restarts automatically upon actuation of one of the answer buttons 30 or the "REPEAT" button 32.

Figure 4A:
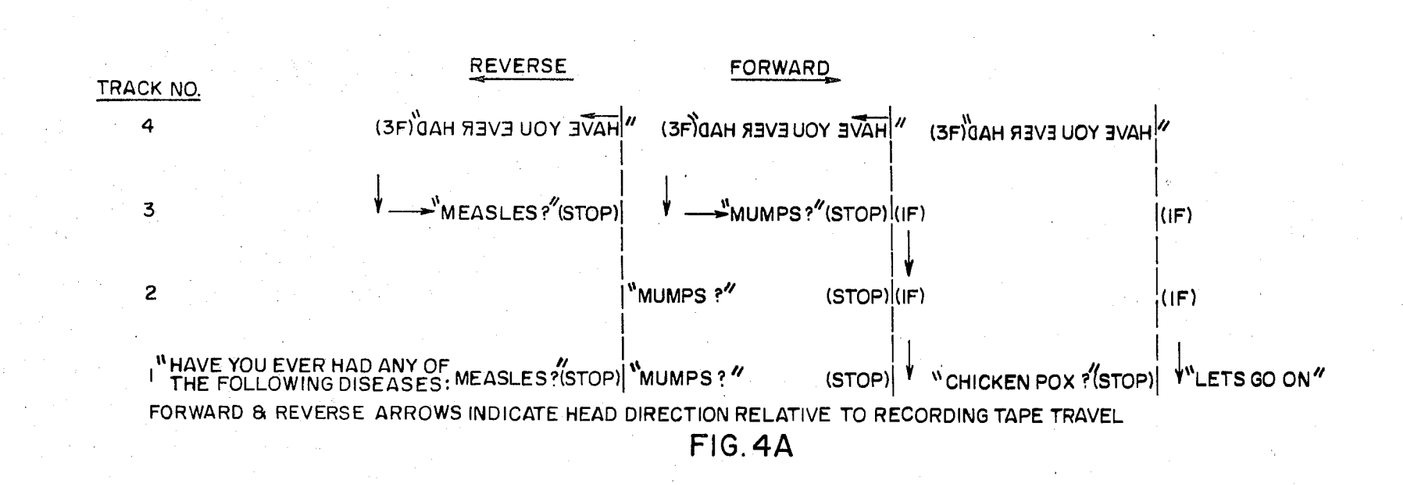
FIGS. 4a and 4b are schematic representations of corresponding lengthwise sections of two four-track magnetic recording tapes; a question tape (FIG. 4a) on which typical questions such as written out in the drawing are recorded in sound together with stop and track selection control tone codes, and a dictionary tape (FIG. 4b) in which typical answers in narrative form as written out in the drawing are recorded in audio code together with stop and track selection control tone codes.
Figure 5:
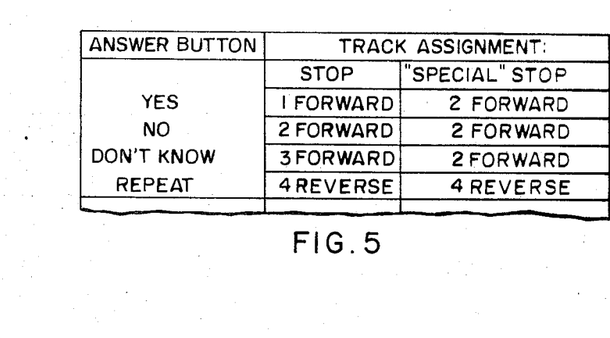
FIG. 5 is a diagram showing an exemplified assignment of tape tracks to which the playback of the question tape deck is switched upon response button selection following regular and "special" stop situations.
Figure 6:
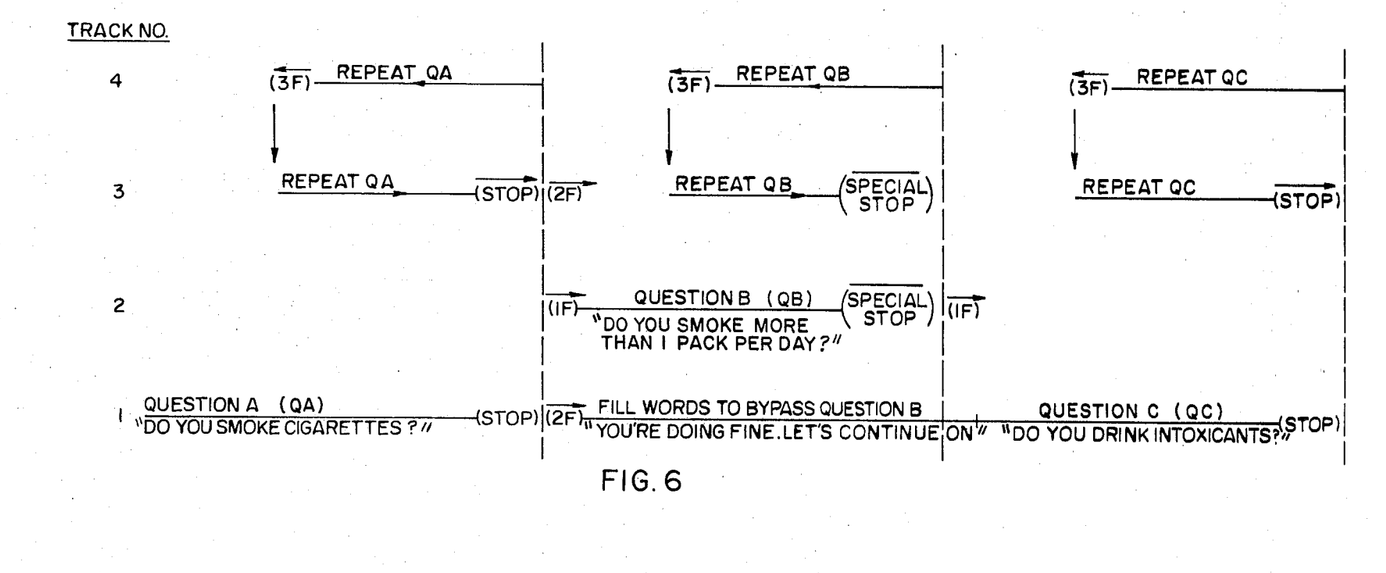
FIG. 6 is a schematic representation of a lengthwise section of the four-track question tape bearing, in audio form, typical questions such as written out in the drawing, affiliated with regular and "special" stop tone codes.

Typical questions relating to the taking of a medical history from a patient as the interrogee, are exemplified in FIGS. 4a and 6 where such questions, which actually are in the form of magnetic voice recordings on the several tracks of the question tape, appear in written form in these figures which depict longitudinal sections of such tape. In FIGS. 4a and 6, the word "Stop" appearing in brackets indicates the location of a regular stop code in audio tone form to which the system responds by stopping the question tape drive means to await for a response from the answer pushbuttons 30 or the repeat pushbutton 32. Following such a regular stop, the track that the tape player starts out on for playing the next question is determined by the response button selected; a matter of player head selection by selective switching. For example, as indicated in the diagram in FIG. 5, selection of "YES" results in tape restart on track one in the forward direction, a "NO" results in restart on track two in the forward direction, a "DON'T KNOW" results in restart on track three in the forward direction, and "REPEAT" results in tape restart on track four in the reverse direction. Again in FIGS. 4a and 6, numerals and a letter in brackets, such as "(1 F)", "(3 R)", etc. represent audio tone codes which are recorded on the question tape to cause switching of the tape playing to a different track and/or direction, such as to track one forward, "1 F", or to track three in the reverse direction, "3 R". In FIG. 6, the words "Special Stop" appearing in brackets indicates the location of a certain stop code for effecting stopping of the tape to await an answer input by the patient and a restart of the tape in response to such input, but in the case of such special stop, a "YES", "NO", or "DON'T KNOW" answer each causes restart of the tape for playing in track two in the forward direction, as indicated in FIG. 5, and a "REPEAT" request restarts for play in track four in the reverse direction, as in the case of a restart after a regular start. All answers, following either a regular stop or a special stop, are recorded by the answer tape player-recorder means 25 in the form of audio tone codes created by generator means 15.

Figure 7:
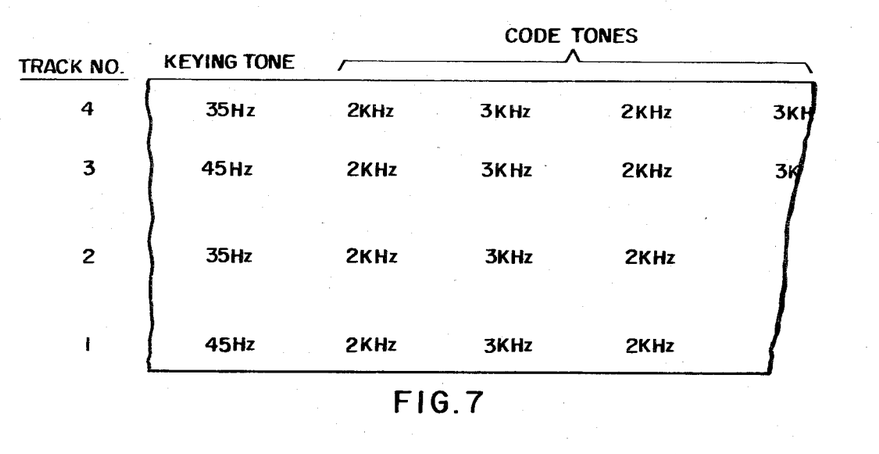
FIG. 7 is a representation of a typical audio tone code pattern of a type suitable for recording on the question and dictionary tapes included in the system of preceding figures; and, FIG. 8 is a section of a typical printout of answer information in narrative form as a portion of a medical history.

A suitable construction for the question-asking portion of the system of the present invention is shown in FIG. 2 as relating to such as a four-track question tape player means 12, and a question tape player control means 12a as including a head switching means 35 for selecting the particular head (not shown) of the player means 12 which shall be listened to, both by the speaker 10 for the patient 13 (FIG. 1), but also by a code reader means 36, which via a control logic means 37 functions to control the aforesaid head switching means as well as a question tape drive means 38 capable of starting, stopping, and running the question tape either forward or backward as called for by such reader and logic means which responds to the audio control tone codes played to it by the player head effectuated by the head switching means. A still more detailed description of a suitable construction for the question-asking portion of the system as employing tone code bursts at a frequency of three kilohertz for representing digital data bits disposed between spacer tone code bursts at a frequency of two kilohertz is disclosed in co-pending patent applications Ser. Nos. 167,581 and 167,582, both filed July 30, 1971 and assigned to the assignee of the present application; the one being titled PROGRAMMED INSTRUCTIONAL SYSTEM, and the other, AUDIO WAVEFORM FOR DIGITAL RECORDING. These tone codes are recorded on the tape between longitudinal portions of the same track that bears the recorded question material played to the patient over the speaker 10, but the presence of a subaudible-frequency tone burst, a keying tone, 40 hertz in the aforementioned copending patent applications, precedes the higher frequency tone code bursts and is used to alert decoding means and to effect silencing of the speaker 10 during playing of these latter bursts which are used for tape player control as exemplified in FIG. 6, for example. Such low frequency keying tone bursts tend to spill over onto adjacent tracks when recorded on closely spaced tracks of a multi-track recording tape to a much greater extent than the higher frequencies, and such spill-over or cross-talk, can cause false keying. The present system employs keying tones of different frequencies on adjacent tracks, one track at 35 hertz, for example, and the adjacent track or tracks at 45 hertz, as shown in FIG. 7. By suitable filtering, each frequency can be distinguished from the other, and false keying by cross-talk from an adjacent track need be of no concern in the present system.

In operation of the question-asking portion of the system as shown in FIG. 2, a four-track question tape (not shown), such as may exist in a tape cassette, is played in the audio question tape player means 12 and listened to by the patient over the speaker means 10, which may be earphones or a telephone set. Initially, the tape will play questions relating to identification of the patient or interrogee and may seek such answers as solicit a social security number. At the end of each of these questions, the stop code on the tape, which may follow answering instructions to the patient, will be read by the code reader means 36, and via the control logic means 37 will cause the question tape drive means 38 to stop and await an answer from the patient. Since at this introductory stage the answer may be numerical and a certain number of digits in length, the control logic means 37 will call for the tape drive means to remain stopped while the patient punches in such as his social security number by pressing the buttons 31 in required sequence to cause the audio code generator means 15 to translate such button pushes into suitable audio code for transmission via line 16 to the answer tape player-recorder means 25 for storage, and/or to the printout portion of the system for real-time printout as previously referred to. At the completion of the patient's answer, the control logic means will effect operation of the tape drive means 38 to restart the tape player means 12 for asking the patient the next question. After each such answer requiring use of the numerical answer buttons 31, it may be preferable to have the question tape play to always start out on the same track and in the same direction, such as track one in the forward direction. Switching the recorder heads to listen to other tracks can be effectuated by audio code tones appearing on the tape and listened to by the reader means 16 and interpreted by the logic means 37 to appropriately control the head switching means 35 and the tape drive means 38.

Following such patient-identifying, or interrogeeidentifying, portion of question tape playing, further questions will relate to questions which may be answered by the "YES", "NO", "DON'T KNOW" pushbuttons 30 which operate to cause generation of the appropriate audio tone signals from means 15 in supply to line 16 for answer tape recording and/or real-time printout, as previously mentioned. Also, as previously referred to, after each of such button-thirty answers following a regular stop of the question tape, the track and direction selected to be played by the player means 12 is determined by the button 30 selected by the interrogee. This is accomplished through the medium of the head switching means 35 and the tape drive means 38 under sanction of the control logic means 37. After a button-thirty answer following a special stop of the question tape, as previously referred to, the control logic means 37 will nullify track selection by the pushbuttons 30 and dictate the head switching means 35 to effectuate the head for track two and operation of the drive means 38 forwardly, as called for by chosen example and as shown in FIG. 5.

Figure 8:
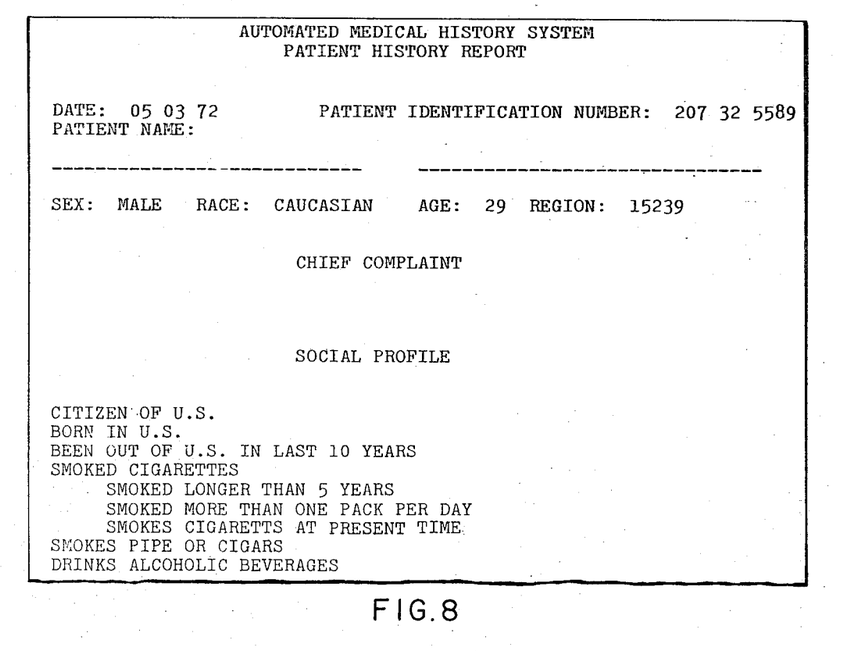

In accord with a feature of the present invention, the dictionary tape player means 20 also may be four-track in correspondence with the four-track question tape player means 12, and the dictionary tape played by such means 20 stores in audio code form narrative answers corresponding to the button-thirty answers chosen by the interrogee, as well as the identification statements, such as appearing on the sample printout shown in FIG. 8. The numerical answers are accepted directly from the line 16 for real-time printout and are recorded on the answer tape of the player means 25 for subsequent callout during post-questioning printout by playback of the answer tape.

Figure 3:
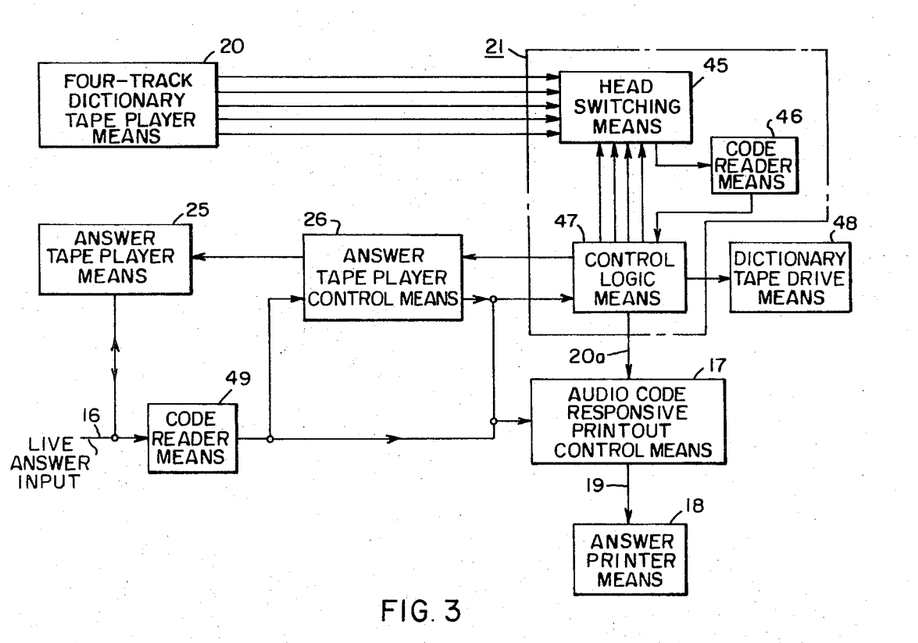
FIG. 3 is a block diagram representing certain details of an answer-printout portion of the system of the present invention.

The printout portion of the system is shown in more detail in FIG. 3, and includes, in manner similar to that of the questioning portion: a head switching means 45 for the dictionary tape player means 20; a code reader means 46 for the dictionary tape code; a control logic means 47; a tape drive means 48; and a code reader means 49 for distinguishing the button-thirty answer codes from the button-thirty-one numerical answer codes.

The printer means 18 may be in the form of a commercially available digital-code-controlled type in which printout is effected by use of heated characters applied to thermographic paper. The printout control means 17 also will be of commercial form of a type responsive to audio code input in ASCII format as received from the dictionary tape by playback therefrom or from the answer tape as representing the button-thirty-one numerical answers.

Figure 4B:
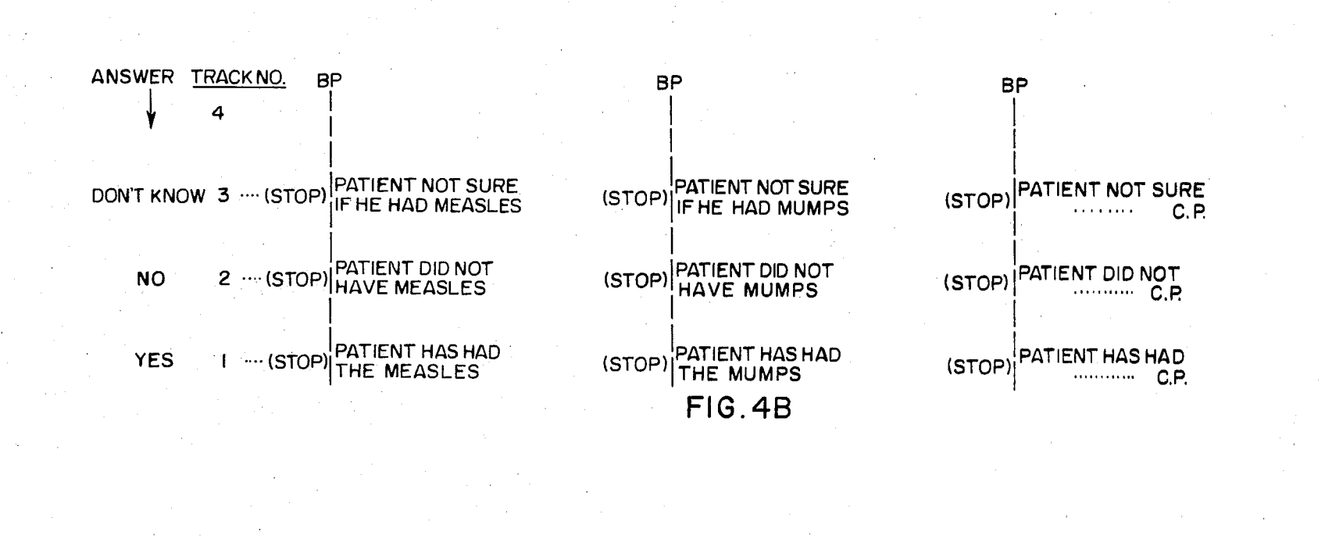

The branching format of the dictionary tape in which the narrative answers are stored corresponds to that of the question tape. A typical answer program for a section of dictionary tape as relating to the taking of a patient's medical history is shown in FIG. 4b, where the answers which would be stored on the tape in audio ASCII form are printed out, together with the word "Stop" in brackets to represent a location of an audio stop code for the tape player, in manner similar to that employed and described in connection with the question tape player means 12 of FIG. 2. Although not shown in FIG. 4b, special stop signals as well as track and direction control signals similar to those described in connection with the question tape and appearing in FIG. 6, also may be employed on the dictionary tape to gain correspondence between the questions on the one tape and the narrative answers on the other.

During real-time printout from the system portion of FIG. 3, the dictionary tape initially will effect printout of a title, legend, the date, etc. without stopping the player means 30 until one of the button-thirty-one questions is played by the question tape, at which time a stop code on the dictionary tape will effect stopping of the drive means 48 by control via the switching means 45, the code reader 46, and the control logic means 47. As the correct number of numerals are received in ASCII audio code via the answer line 16 as a result of button 31 pushing, the code reader means 49, together with the control logic means 47 will route such ASCII code to the printer control means 17 for effecting printout of the appropriate numerical answer. Following this, receipt of the next answer by the control logic means 47 will restart the tape drive means 48 and operate the head switching means 45 to effect answer printout in accord with such answers. The button-thirty audio codes when arriving following the regular stop of the dictionary tape, as in the case of the question tape will cause the switching means 45 to pick a playback track that corresponds to the particular button 30 which was pushed, with the control logic means 47 listening to any special stop codes or track-and-drive-direction dictating codes on the dictionary tape via the code reader means 46 in readiness to control the switching means 45 and tape drive means 48 accordingly.

So long as the dictionary tape player means is automatically stopped after each answer narration, printout is restarted for play along a track which corresponds to the tone code answers, and such printout does not time-overlap the tone code answer spacing, the system will function to maintain correspondence between the answer narration printout from the dictionary tape and the questions asked by the question tape. To afford opportunity for printout time periods in excess of tone code answer intervals, or vice versa, to allow for answer intervals shorter than printout time periods, such tone code answers as arriving at line 16 in real time or from playback operation of the answer tape player means 25, can be stored in a buffer storage means (not shown) interposed between code reader means 49 and the control logic means 47, to impose a suitable delay. In any event, even though some delay may be imposed between tone code answer generation and printout response, it will be appreciated that printout of answers can be ensuing at the same time that questions are being played from the tape player means 12, and that this may be considered as "real-time" printout in the context of the present system.

We claim:

1. An automated interrogating and reporting system comprising:

multi-track audio question tape player means employing an audio question tape having parallel tracks with different questions voice-recorded thereon respectively between automatically effectuated tape stopping points, speaker means for audibly presenting questions played by said question tape player means to an interrogee, signal conveying means for transmitting question tape player means audio output to said speaker means, an interrogee-operated selective response means, including audio tone code generator means, for generating audio tone code answer signals according to answer choices of the interrogee, multi-track audio dictionary tape player means employing a dictionary tape having parallel tracks with different narrative-answer-printout-control audio code command signals recorded thereon respectively between automatically effectuated tape stopping points, audio dictionary tape player control means, signal conveying means for transmitting said audio tone code answer signals from said tone code generator means to said dictionary tape player control means for operating said audio dictionary tape player means, printer means, audio-code-responsive printout control means for said printer means, and signal conveying means for transmitting narrative-answer-printout-control audio code command signals from said dictionary tape player means to said printout control means.

2. The system of claim 1, including an audio answer tape recorder means for storing said audio tone code answer signals.

3. The system of claim 1, wherein:
said system further includes question tape player control means responsive to said interrogee-operated selective response means for effecting restarting of said question tape and selection of its track to be listened to, and
said dictionary tape player control means is responsive to said audio tone code answer signals to effect restarting of said dictionary tape and selection of its track to be printed out.

4. The system of claim 3, wherein said question tape includes audio tone code signals for effecting stopping of the tape and switching of playback from one track to another, and a sub-audible keying tone signal for cutoff of said speaker means from such audio tone code signals.

5. The system of claim 4, wherein different frequencies are employed on adjacent tracks for such subaudible keying tone signals.

6. The system of claim 5, further including head switching means normally controlled by said interrogeeoperated selective response means for said question tape player means for selecting tape track playback, and a control logic means for rendering said head switching means responsive to said audio tone code signals on said question tape upon restart following playing of a special stop signal on such tape.

* * * * *